United States Patent
Kurokawa

(10) Patent No.: US 10,183,369 B2
(45) Date of Patent: Jan. 22, 2019

(54) CUTTING FLUID SUPPLY SYSTEM TO MACHINE TOOL

(71) Applicant: FANUC Corporation, Yamanashi (JP)

(72) Inventor: Takashi Kurokawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/979,498

(22) Filed: Dec. 27, 2015

(65) Prior Publication Data

US 2016/0184951 A1    Jun. 30, 2016

(30) Foreign Application Priority Data

Dec. 26, 2014  (JP) ................. 2014-264936

(51) Int. Cl.
| | |
|---|---|
| B23Q 11/00 | (2006.01) |
| B23Q 17/20 | (2006.01) |
| B23Q 17/22 | (2006.01) |
| B23Q 11/10 | (2006.01) |
| B25J 11/00 | (2006.01) |

(52) U.S. Cl.
CPC .......... B23Q 11/1076 (2013.01); B23Q 17/20 (2013.01); B25J 11/00 (2013.01); *Y10S 901/41* (2013.01)

(58) Field of Classification Search
CPC .... B23Q 11/1076; B23Q 17/20; B23Q 17/22; B23Q 17/2208; B23Q 17/2428; Y10T 408/46; Y10T 408/458
See application file for complete search history.

(56) References Cited

U.S. PATENT DOCUMENTS

| | | | | |
|---|---|---|---|---|
| 3,718,757 | A * | 2/1973 | Gulitz | C30B 15/26 117/201 |
| 5,186,394 | A * | 2/1993 | Tsuji | B05B 15/067 239/263.3 |
| 5,281,079 | A * | 1/1994 | Lemelson | B23Q 41/00 29/26 A |
| 5,444,634 | A * | 8/1995 | Goldman | G05B 19/182 184/6.1 |
| 6,772,042 | B1 * | 8/2004 | Warren | B23Q 11/1084 408/61 |

(Continued)

FOREIGN PATENT DOCUMENTS

| | | |
|---|---|---|
| CN | 104440378 A | 3/2015 |
| JP | 61-260964 A | 11/1986 |

(Continued)

OTHER PUBLICATIONS

JP 07-276184 A Claim + Detailed Description (computer translation) available at https://dossier1.j-platpat.inpit.go.jp/tri/all/odse/ODSE_GM101_Top.action (last visited Mar. 17, 2017).*

(Continued)

*Primary Examiner* — Ryan Rufo
(74) *Attorney, Agent, or Firm* — Hauptman Ham, LLP

(57) ABSTRACT

A cutting fluid supply system includes a machine tool, a nozzle for ejecting cutting fluid, and a nozzle-moving unit for holding and moving the nozzle. The cutting fluid supply system detects an object existing in the machine tool, recognizes a position and a shape of the object based on the detection information, and specifies a machining point from the recognized information. The nozzle-moving unit moves the nozzle such that cutting fluid is ejected to the specified machining point.

6 Claims, 3 Drawing Sheets

(56) References Cited

U.S. PATENT DOCUMENTS

| | | | | |
|---|---|---|---|---|
| 2002/0146297 A1* | 10/2002 | Curtis | ............... | B23H 1/10 |
| | | | | 409/132 |
| 2009/0263199 A1* | 10/2009 | Wang | ............... | B23Q 15/22 |
| | | | | 408/16 |
| 2009/0312858 A1* | 12/2009 | Alpay | ............... | B23K 26/38 |
| | | | | 700/103 |
| 2012/0004760 A1* | 1/2012 | Bonerz | ............. | B23Q 17/2208 |
| | | | | 700/178 |
| 2012/0089247 A1* | 4/2012 | Kawauchi | ............... | B23Q 17/20 |
| | | | | 700/178 |
| 2013/0071198 A1* | 3/2013 | Kiryu | ............... | B23Q 15/013 |
| | | | | 409/80 |

FOREIGN PATENT DOCUMENTS

| | | | | | |
|---|---|---|---|---|---|
| JP | 06-206139 A | * | 7/1994 | ............. | B23Q 11/10 |
| JP | 07-276184 A | * | 10/1995 | ............. | B23Q 11/10 |
| JP | 7-276184 A | | 10/1995 | | |
| JP | 07-299694 A | * | 11/1995 | ............. | B23Q 11/10 |
| JP | 08-187641 A | * | 7/1996 | ............. | B23Q 11/10 |
| JP | 10-118884 A | * | 5/1998 | ............. | B23Q 11/10 |
| JP | 2001-212735 A | | 8/2001 | | |
| JP | 2001-322049 A | | 11/2001 | | |
| JP | 2002-18674 A | | 1/2002 | | |
| JP | 2006-102923 A | * | 4/2006 | ............. | B23Q 15/00 |
| JP | 2007-273527 A | | 10/2007 | | |
| JP | 2009-140251 A | * | 6/2009 | ............. | G05B 19/19 |

OTHER PUBLICATIONS

Office Action in JP Application No. 2014-264936, dated Feb. 16, 2016.

* cited by examiner

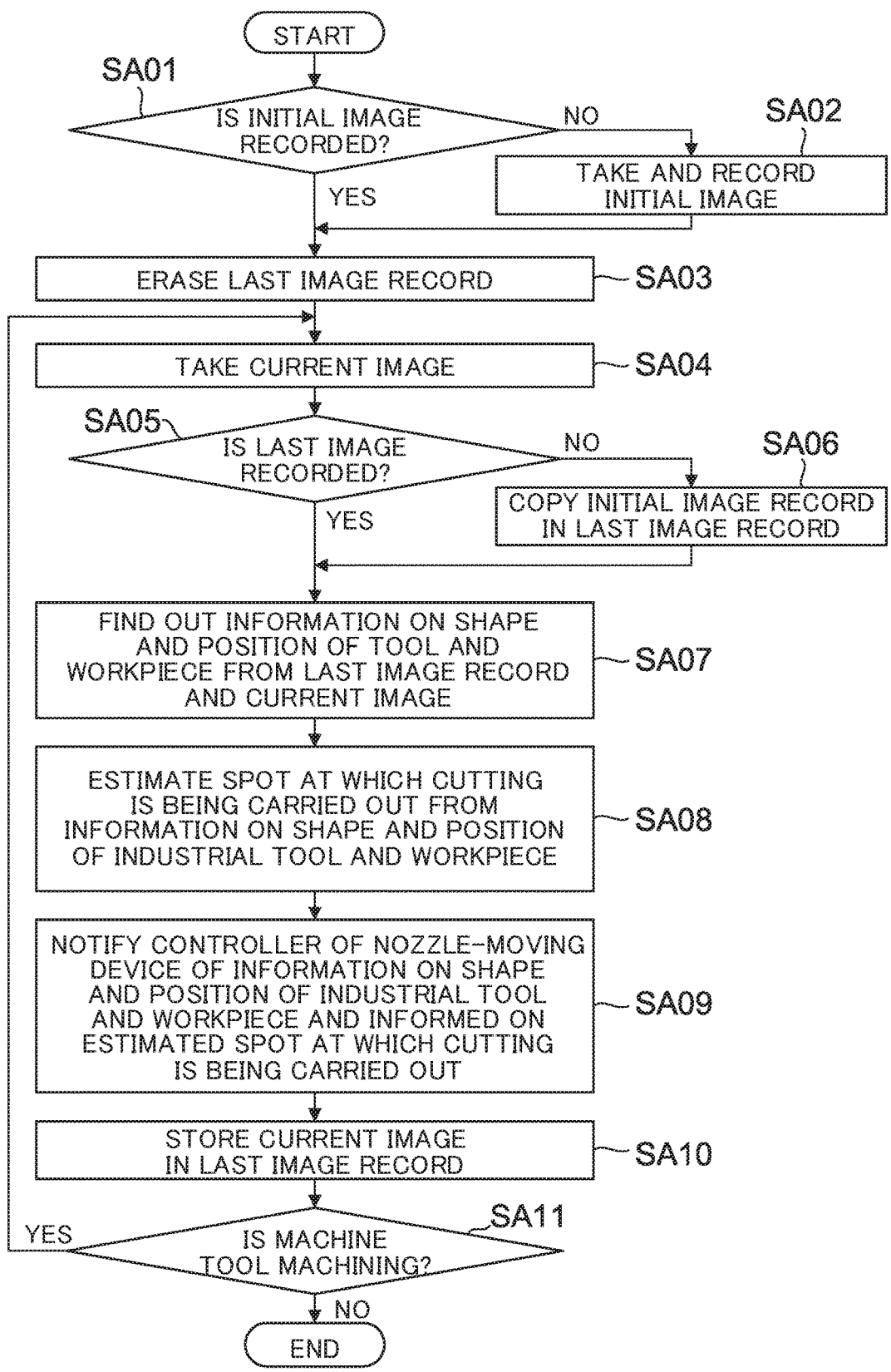

CUTTING FLUID SUPPLY SYSTEM TO MACHINE TOOL

RELATED APPLICATIONS

The present application claims priority to Japanese Application Number 2014-264936, filed Dec. 26, 2014, the disclosure of which is hereby incorporated by reference herein in its entirety.

BACKGROUND OF THE INVENTION

1. Field of the Invention

The present invention relates to a cutting fluid supply system to a machine tool.

2. Description of the Related Art

In a cutting operation in a machine tool, generally, to lubricate between a workpiece and a cutting blade, to cool heat generated by the cutting operation carried out by the cutting blade, to elongate lifetime of the cutting blade caused by removing chip generated by the cutting operation of the work from a cutting spot, and to stably carry out the cutting operation, cutting fluid is ejected to a spot where the work and the cutting blade come into contact with each other during the cutting operation. This is called cutting fluid supply.

The cutting fluid is generally supplied in such a manner that an operator of a machine tool manually sets an ejection direction of a cutting fluid supplying nozzle which is fixed to any one of portions in the machine tool. Because of manual setting, there are differences between individuals, and when the same cutting operation is carried out again, reproducibility of the setting operation of the direction is poor.

Hence, in case where the same products are machined using a plurality of machine tools, or in a case where the same products are machined again after these products are once machined at a manufacturing site of a wide variety of products in small quantities, the supply of cutting fluid varies and as a result, there is a possibility that qualities of the worked products may vary. Further, since there is also a possibility that the setting of the ejection direction is misaligned while repeating the cutting operation, qualities of the worked products may be deteriorated during mass production.

For some of the numerically-controlled machine tools, cutting operation is automatically proceeded with switching between a plurality of industrial tools and changing a direction of the industrial tool. However, an appropriate cutting fluid supply spot varies depending upon the followings:
 an industrial tool blade (length, diameter and type of industrial tool);
 a shape of a workpiece; and
 a progress degree of the cutting operation.
Therefore, in such numerically-controlled machine tools, an appropriate cutting fluid supply spot varies with progress of automatic cutting operation.

On the other hand, even in the case of the above-described automated numerically-controlled machine tool, generally, an operator manually sets a direction of a cutting fluid supplying nozzle during the cutting fluid supply as described above. Further, the operator generally cannot touch the cutting fluid supplying nozzle during the automatic cutting operation for prevention of accidents.

Therefore, when the automatic cutting operation is carried out by the machine tool, a spot where the cutting fluid is supplied is fixed in many cases despite the fact that the appropriate cutting fluid supply spot varies with progress of the automatic cutting operation. Therefore, the cutting fluid supply is brought into an improper state during the automatic cutting operation in some cases. In such a state, lack of cutting fluid may cause reduction of the surface quality of the workpiece, and reduction of the life of the industrial tool.

To solve such a problem concerning the cutting fluid supply, Japanese Patent Application Laid-Open No. 61-260964 proposes, for example, a system for driving a direction of the cutting fluid supplying nozzle by a servomotor or the like. However, this technique requires great care. For example, to automatically determine an appropriate cutting fluid supply spot, it is necessary to provide a driving system of the cutting fluid supplying nozzle with a large quantity of information on the side of the machine tool such as shape data of the industrial tool, a working program and a progress status of a cutting operation (position information of machine tool and number of industrial tool which is being used), or it is necessary that a human first teaches motion (such as direction) of the cutting fluid supplying nozzle while seeing a state of a cutting operation.

If a position of the cutting fluid supplying nozzle is fixed as in the current status, when a workpiece has an extremely large difference in level or when a cradle portion in a cradle-type five-axis machine tool largely moves, a path of cutting fluid supply is blocked by a level-difference of a workpiece itself or by a four-axis or five-axis mechanism portion in some cases.

SUMMARY OF THE INVENTION

In view of the problems of the related art, it is an object of the present invention to provide a cutting fluid supply system capable of specifying, as a machining point, a spot where an industrial tool comes into contact with a surface of a workpiece, or a spot where the surface of the workpiece and the industrial tool intersect with each other, and capable of automatically and always supplying cutting fluid to the specified machining point appropriately.

A cutting fluid supply system according to the present invention includes: a machine tool; a nozzle for ejecting cutting fluid; a supply device for supplying the cutting fluid to the nozzle; a nozzle-moving unit for holding and moving the nozzle; an object-detecting device for detecting an object existing in the machine tool; an information-processing unit for recognizing a position and a shape of the object based on detection information of the object-detecting device; and a machining point specifying unit for specifying a machining point from the information which is recognized by the information-processing unit. The nozzle-moving unit moves the nozzle such that the cutting fluid is ejected to the machining point which is specified by the machining point specifying unit.

The nozzle-moving unit may be configured to control at least one of a position and a direction of the nozzle.

The nozzle-moving unit may be configured to take control of ejection of the cutting fluid.

The nozzle-moving unit may be an industrial robot.

The present invention can provide a cutting fluid supply system capable of specifying, as a machining point which is a spot where an industrial tool comes into contact with a surface of a workpiece or a spot where the surface of the workpiece and the industrial tool intersect with each other and the system is capable of automatically and always supplying cutting fluid to the specified machining point appropriately.

BRIEF DESCRIPTION OF THE DRAWINGS

These and other features and advantages of the present invention will become apparent from description of the following embodiment with reference to the accompanying drawings, wherein:

FIG. 3 is a flowchart showing an operation of the cutting fluid supply system shown in FIG. 2 (position and attitude control processing of cutting fluid supplying nozzle which controls nozzle-moving device).

DETAILED DESCRIPTION OF THE PREFERRED EMBODIMENTS

Figure 1:
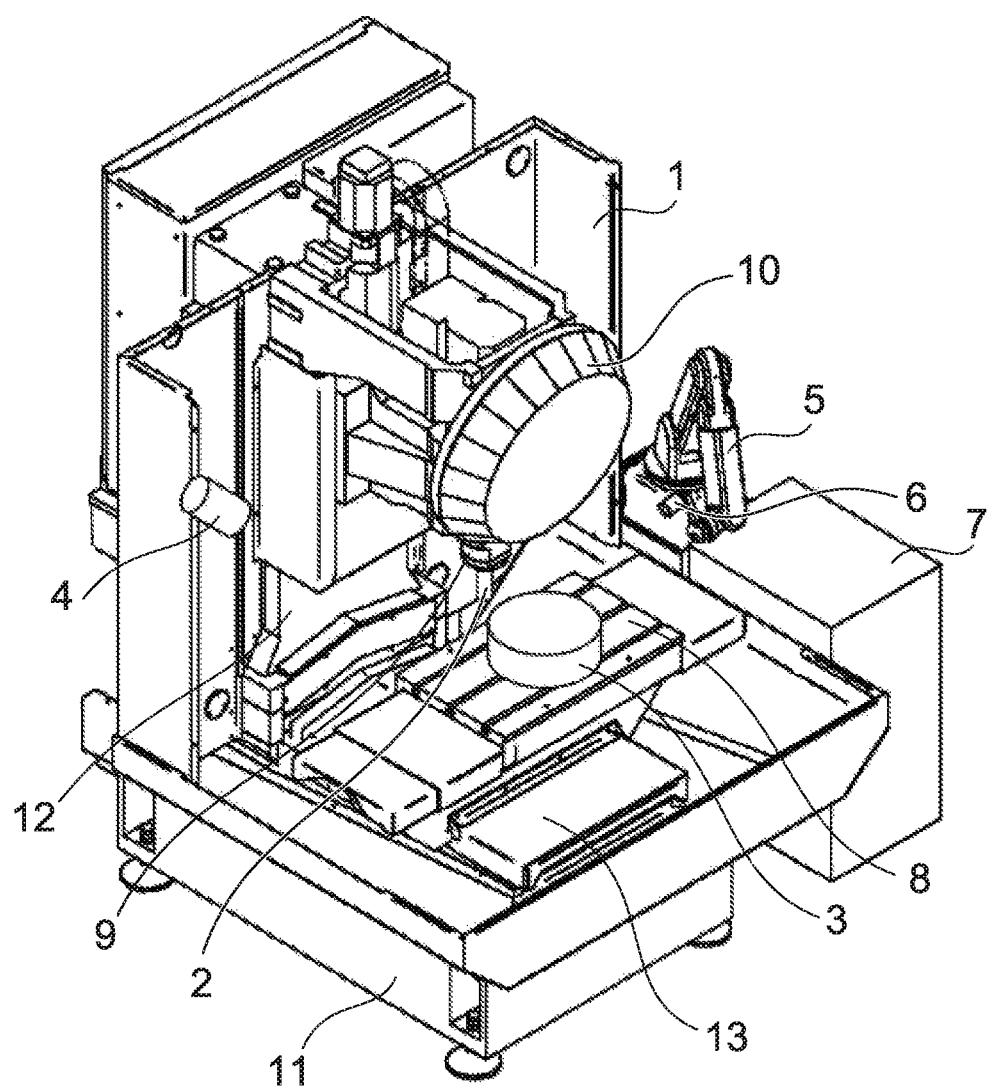
FIG. 1 is a diagram showing one example of a cutting fluid supply system according to the invention.

FIG. 1 is a diagram showing one example of a cutting fluid supply system according to the present invention.

As shown in FIG. 1, the cutting fluid supply system includes a machine tool 1, a cutting fluid supply device 7, a cutting fluid supplying nozzle 6 for ejecting cutting fluid which is supplied from the cutting fluid supply device 7, a nozzle-moving device 5 for moving the nozzle 6, at least one or more detecting devices 4 such as a video sensor connected to the nozzle-moving device 5, and an information-processing unit (not shown) for processing information which is output from the detecting device 4 such as the video sensor.

The cutting fluid supply system has a function to monitor a position and a shape of each of a workpiece 3 and an industrial tool 2 of the machine tool 1 by the detecting device 4 such as the video sensor, and to recognize a "machining point" which is a spot of a surface of the workpiece 3 with which the industrial tool 2 comes into contact or a spot of the surface of the workpiece 3 with which the industrial tool 2 intersects.

The machine tool 1 includes a table 8 and a column 12 provided on a bed 11 through a saddle 13. The workpiece 3 is placed on the table 8. The industrial tool 2 is attached to a spindle 9. The industrial tool 2 can be switched by a tool exchanger apparatus 10. The workpiece 3 on the table 8 is worked by the industrial tool 2 which is attached to the spindle 9. Generally, in the machine tool 1, a workpiece space (interior of machine) where the workpiece 3 is worked is shield from outside by a cover (not shown) so that the cutting fluid and working chip are not scattered to outside. However, when the cutting fluid or working chip is allowed to be scattered to outside, such a cover is unnecessary.

Cutting fluid is supplied from the cutting fluid supply device 7 to the "machining point" of the workpiece 3 worked by the industrial tool 2. A medium supplied from the cutting fluid supply device 7 to the machining point is the cutting fluid, oil mist or air. The cutting fluid supply device 7 is a pump for ejecting the cutting fluid, oil mist or air to the machining point.

The nozzle-moving device 5 may be an industrial robot. When the nozzle-moving device 5 is the robot, the cutting fluid supplying nozzle 6 is mounted on a tip end of an arm of the robot. Cutting fluid supplied from the cutting fluid supply device 7 is ejected from the cutting fluid supplying nozzle 6 toward the machining point. The cutting fluid supplying nozzle 6 and the nozzle-moving device 5 which moves the nozzle 6 are placed on the inner side of the cover (not shown) of the machine tool 1 or the compartment formed by expanding the cover (not shown) of the machine tool 1. However, when cutting fluid or working chip may be scattered to outside, locations of the nozzle 6 and the nozzle-moving device 5 are not limited to the above-described locations. The robot as the nozzle-moving device 5 may have another function when the machine tool 1 need not supply cutting fluid. For example, the robot may have other functions to take out a workpiece 3 after the cutting operation or to mount a workpiece 3 before it is worked.

Figure 2:
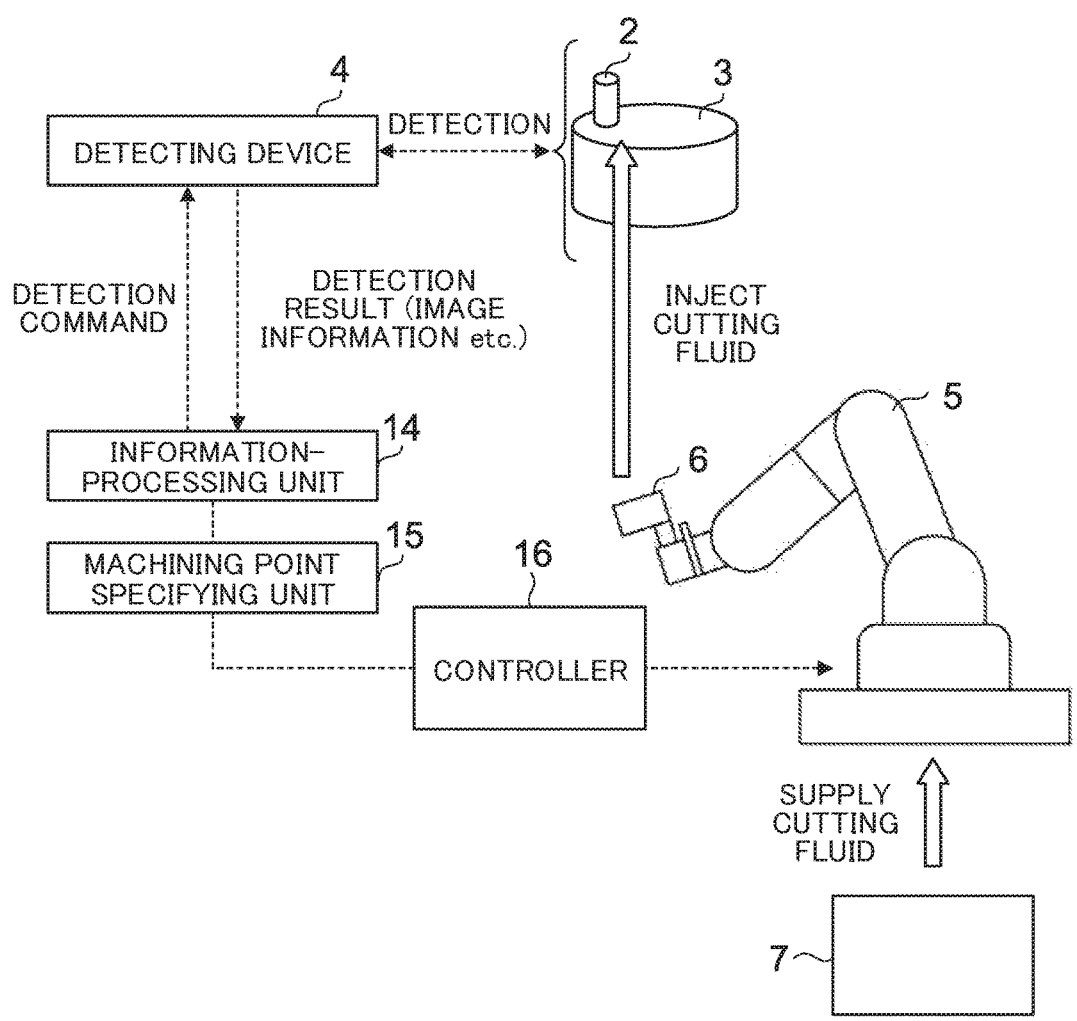
FIG. 2 is a functional block diagram of the cutting fluid supply system shown in FIG. 1.

FIG. 2 is a functional block diagram of the cutting fluid supply system of the present invention.

The cutting fluid supply system has a function to detect the industrial tool 2 and the workpiece 3 in the machine tool 1 by the detecting device 4 such as a video sensor. The information-processing unit 14 outputs detection command to the detecting device 4, the detecting device 4 detects the industrial tool 2 and the workpiece 3, and sends the detected information to the information-processing unit 14. However, a range and an objective which can be detected by the detecting device 4 are not limited to the above-described matters.

The information-processing unit 14 recognizes the shape information and position information of each of the industrial tool 2 and the workpiece 3 by processing information detected by the detecting device 4, and sends the recognized shape information and position information to a machining point specifying unit 15.

From the shape information and the position information of each of the industrial tool 2 and the workpiece 3 which is recognized by the information-processing unit 14, the machining point specifying unit 15 specifies the machining point which is a spot of the surface of the workpiece 3 with which the industrial tool 2 comes into contact or spot of the surface of the workpiece 3 with which the industrial tool 2 intersects, and sends the information (position information) on the specified machining point to a controller 16 of the nozzle-moving device 5 together with the shape information and the position information of each of the industrial tool 2 and the workpiece 3.

Based on the information of the machining point and the shape information and the position information of each of the industrial tool 2 and the workpiece 3, the controller 16 of the nozzle-moving device 5 avoids interference between the workpiece 3, the industrial tool 2 and interior structures of the machine tool 1 (including the detecting device 4, the table 8, the spindle 9, the tool exchanger apparatus 10, the bed 11, the column 12, the saddle 13, as well as a jig and an additional axes (not shown)), and in this state, the controller 16 drives the nozzle-moving device 5 such that the cutting fluid is ejected from the cutting fluid supplying nozzle 6 toward the machining point.

FIG. 3 is a flowchart showing an operation of the cutting fluid supply system shown in FIG. 2 (position and attitude control processing of cutting fluid supplying nozzle which controls nozzle-moving device). The processing will be explained below in accordance with respective steps.

[Step sa01] It is checked whether an initial image is recorded, and if there is no initial image (NO), the procedure proceeds to step sa02. If there is an initial image (YES), the procedure proceeds to step sa03.

[Step sa02] The initial image is taken and recorded, and the procedure proceeds to step sa03. Here, the initial image may be an image of a head of the spindle 9 in a state where the industrial tool 2 is not attached or an image of the table 8 in a state where the workpiece 3 is not attached.

[Step sa03] The last image is erased.

[Step sa04] The current image is taken. Here, the current image may be an image of the industrial tool 2 which is processing (cutting) the workpiece 3 by the machine tool 1 or an image of the workpiece 3 which is being processed (cut) by the industrial tool 2 in the machine tool 1.

[Step sa05] It is checked whether the last image is recorded, and if the last image is not recorded (NO), the procedure proceeds to step sa06, and if the last image is recorded (YES), the procedure proceeds to step sa07.

[Step sa06] The record of the initial image is copied in the record of the last image, and the procedure proceeds to step sa07.

[Step sa07] The shape information and the position information of each of the industrial tool 2 and the workpiece 3 are found out from the record of the last image and from the current image.

[Step sa08] A spot (machining point) at which cutting is being carried out is estimated from the shape information and the position information of each of the industrial tool 2 and the workpiece 3.

[Step sa09] The controller 16 which controls the nozzle-moving device 5 is informed of the shape information and the position information of each of the industrial tool 2 and the workpiece 3 and the information of the spot (machining point) at which cutting is being carried out. The controller 16 which controls the nozzle-moving device 5 controls the position and the attitude of the cutting fluid supplying nozzle 6 so that the cutting fluid can be supplied to a spot of the workpiece 3 at which cutting is being carried out by the industrial tool 2.

In determination of a position and an attitude of the cutting fluid supplying nozzle 6 made by the nozzle-moving device 5, avoidance of interference between the nozzle-moving device 5 (including cutting fluid supplying nozzle 6) and interior structures of the machine tool 1 (including the detecting device 4, the table 8, the spindle 9, the tool exchanger apparatus 10, the bed 11, the column 12, the saddle 13, as well as the jig and the additional axes) and the workpiece 3 and the industrial tool 2, and securing a path for ejection of the cutting fluid (for avoiding an obstacle) and avoidance of any hindrance of detection by the detecting device 4 are taken into consideration. Switching between ejection and non-ejection of cutting fluid is considered in accordance with the presence or absence of the cutting fluid supply spot (machining point).

[Step sa10] The current image is stored in the last image record as the last image.

[Step sa11] It is determined whether or not the machine tool 1 is cutting the workpiece 3, and if the machine tool 1 is cutting (YES), the procedure returns to step sa04 and this processing is continued, and if the machine tool 1 is not cutting (NO), this cutting operation is completed.

A method for detecting a machining point from information obtained by the detecting device 4 such as the video sensor will be described below. As a method for detecting, from information obtained by the detecting device 4, a machining point which is a spot of the surface of the workpiece 3 with which the industrial tool 2 comes into contact or spot of the surface of the workpiece 3 with which the industrial tool 2 intersects, the following example can be considered.

A general machining center will be described as an example. The detecting device 4 such as a video sensor previously takes images of a head of the spindle 9 to which the industrial tool 2 is not attached and the table 8 to which the workpiece 3 is not attached, and the images are stored as a tool detection reference image and a workpiece detection reference image.

The images of the head of the spindle 9 to which the industrial tool 2 is attached and the images of the table 8 to which the workpiece 3 or a jig is attached are taken before the cutting operation is started or immediately after the industrial tool is switched. If necessary in this image pickup operation, a plurality of video sensors may be used or a video sensor mounted on the nozzle-moving device 5 may take images from a plurality of positions.

The previously stored reference images, which are the images of the head of the spindle 9 to which the industrial tool 2 is not attached and the table 8 to which the workpiece 3 is not attached, are compared with the images of the industrial tool 2 attached to the spindle 9 and the workpiece 3 placed on the table 8, which are taken before the cutting operation is started or immediately after the industrial tool is switched, thereby detecting and storing initial shapes and positions of the industrial tool 2 and the workpiece 3. Thereafter, movements of the industrial tool 2 and the workpiece 3 and a shape of the workpiece 3 are detected by repeating the image pickup operation of the industrial tool 2 and the workpiece 3 and comparison between the images which are taken currently and images which are taken last time. Utilizing the current shapes and position information of the industrial tool 2 and the workpiece 3 obtained from the image and utilizing the initial shapes and position information of the previously detected industrial tool 2 and the workpiece 3, the spot (machining point) of the surface of the workpiece 3 with which the industrial tool 2 comes into contact or the spot of the surface of the workpiece 3 with which the industrial tool 2 intersects are detected.

However, the method for detecting the spot (machining point) of the surface of the workpiece 3 with which the industrial tool 2 comes into contact or the spot of the surface of the workpiece 3 with which the industrial tool 2 intersects from the information obtained by the detecting device 4 is not limited to the above-described method. In the above-described method for example, the detecting device 4 is the video sensor, but variation of images caused by color or droplet of cutting fluid is not taken into consideration. Therefore, in a dry processing in which the cutting fluid is transparent or the oil mist is used instead of the cutting fluid, there is a possibility that the method cannot normally function unless locations in the vicinity of the industrial tool 2 and the workpiece 3 are transparent also during the supplying operation of the cutting fluid. Hence, only by the above-described method, it is also considered that a normal operation cannot be expected if the supplying operation of cutting fluid is started.

Therefore, images of the head of the spindle 9 which is not influenced by cutting fluid supply so much and whose relative position with respect to the industrial tool 2 does not vary, and images of an end of the table 8 which is not influenced by cutting fluid supply so much and whose relative position with respect to the workpiece 3 does not vary are also taken simultaneously, position information obtained from a portion of which images can normally be taken even during the supplying operation of cutting fluid, and shape information and position information of the initially stored industrial tool 2 and the workpiece 3 are combined with each other, and a current position may be estimated and detected. The number of video sensors may be increased and image pickup results from other angles may be used concurrently (to cover dead angle generated by operation of machine tool 1). Various kinds of detection methods may be used concurrently. For example, by additionally using a thermal sensor (thermograph), another detecting method of different kind may also be used for determining a cutting fluid supply spot (machining point) by taking into consideration a spot at which heat continues to generate by cutting operations.

Further, like the conventional system, the information-processing unit 14 of the system and a controller (not shown) of the machine tool 1 are connected to each other through an interface (I/F), an industrial tool number at the time of cutting operation and position information of respective axes are taken in from the machine tool 1, and the incorporated position information thus taken in and information obtained by processing an image obtained by the information-processing unit 14 of the system are used concurrently and compared with each other. According to this, it is possible to always supply cutting fluid to an optimal position, and the position information on the respective axes obtained from the machine tool 1 may be used for calculation of displacement of the industrial tool 2 and the workpiece 3 caused by the cutting operation.

The controller 16 controls the nozzle-moving device 5 such that the cutting fluid is supplied to a spot (machining point) processed by the information-processing unit 14 and detected by the machining point specifying unit 15. To supply cutting fluid by the nozzle-moving device 5, the controller 16 of the nozzle-moving device 5 controls a nozzle position, an ejection direction of the cutting fluid and whether or not to eject the cutting fluid.

In addition to the function to supply the cutting fluid to one point, the nozzle-moving device 5 also may have a function to supply the cutting fluid in accordance with the industrial tool 2 and the cutting operation. For example, when it is determined that the industrial tool 2 has a large bore diameter, cutting fluid may periodically be supplied to several locations in the vicinity of an outer shape portion of the industrial tool, or when it is estimated that the industrial tool 2 is a thin and long drill, with the aim of removing chips generated by drilling and tangled with the drill, the cutting fluid may be supplied also to a cutting blade portion which is exposed from the workpiece 3 at the appropriate times.

The controller 16 of the nozzle-moving device 5 has such a function that when an interference material detected by the information-processing unit 14 exits between a spot (machining point) detected by the machining point specifying unit 15 and a position of the current cutting fluid supplying nozzle 6, the cutting fluid supplying nozzle 6 is moved such that it avoids the interference material and maintains the ejection of the cutting fluid to the machining point.

When an industrial robot is used as the nozzle-moving device 5, the industrial robot itself and the cutting fluid supplying nozzle 6 included in the industrial robot have a function of operating in an area where the robot and the nozzle 6 do not interfere with the workpiece 3, the industrial tool 2 and the interior structures (including the detecting device 4, the table 8, the spindle 9, the tool exchanger apparatus 10, the bed 11, the column 12, the saddle 13, as well as the jig and the additional axes) of the machine tool 1. According to this robot, since the detecting device 4 such as the video sensor and the nozzle-moving device 5 automatically determine the presence or absence of a spot (machining point) detected by the machining point specifying unit 15 (that is, determination of a cutting fluid supply spot) and supply cutting fluid to that spot, setting operation of a cutting fluid supplying nozzle which is currently and generally carried out by an operator becomes unnecessary, as a result, labor of a set-up operation is saved, and a burden of the operator is reduced.

According to the present invention, it is possible to eliminate problems resulting from a fact that an operator sets the cutting fluid supplying nozzle, i.e., problems that even if the same operator sets the nozzle, the setting differs whenever the operator sets, a difference is generated in the setting due to an individual habit, and it is difficult to apply the same setting to a plurality of machine tools. Since the cutting fluid is constantly supplied, it is possible to always carry out the stable cutting operation.

Since the nozzle-moving device 5 controls the cutting fluid supplying nozzle 6, it is possible to control the cutting fluid supplying nozzle 6 even if the machine tool 1 is carrying out the cutting operation, and it is possible to maintain the appropriate cutting fluid supply state even if the cutting operation progresses and the cutting fluid supply spot varies. Hence, it is possible to expect that quality of the worked product is enhanced, and lifetime of an industrial tool to be used is elongated.

As described above, the present invention is able to automation the appropriate of the cutting fluid supply by the following steps.

Recognize the shapes and positions of the industrial tool 2 and the workpiece 3 by using the detecting devices such as video sensors.

Detect or estimate the "machining point" by using the recognized information. ("machining points" is the meaning of the follows. a spot of the surface of workpiece 3 with which the industrial tool 2 comes into contact or a spot of the surface of the workpiece 3 with which the industrial tool 2 intersects in cutting operation.)

Supply the cutting fluid to the "machining point" by the cutting fluid supply nozzle 6 which is controlled with the nozzle moving device 5 (robot etc.).

Detect devices, such as video sensors recognize the shapes and positions of the industrial tool 2 and the workpiece 3.

Detect or estimate the "machining point" by using the recognized information. ("machining points" is the meaning of the follows. a spot of the surface of workpiece 3 with which the industrial tool 2 comes into contact or a spot of the surface of the workpiece 3 with which the industrial tool 2 intersects in cutting operation.)

Supply the cutting fluid to the "machining point" by the cutting fluid supply nozzle 6 which is controlled with the nozzle-moving-device 5 (robot etc.)

Even if the products are changed, the operator's setting operation for the cutting fluid supplying nozzle (trial time etc.) become unnecessary, and high efficiency of the operation can be expected. Further, since the cutting fluid supply is appropriately maintained, it is possible to expect that the cutting operation is stabilized, quality of the worked product is enhanced, and lifetime of the industrial tool to be used is elongated.

According to the present invention, since the cutting fluid supplying nozzle 6 is moved by the nozzle-moving device 5 such as the robot, it is possible to flexibly change not only the direction of the cutting fluid supplying nozzle 6 but also its position. Accordingly, even if a path for supplying the cutting fluid is hindered, it is possible to keep supplying the cutting fluid using a path which avoids the hindered path.

The invention claimed is:

1. A cutting fluid supply system, comprising:
a machine tool;
a fluid ejection nozzle configured to eject cutting fluid;
a fluid supply configured to supply the cutting fluid to the fluid ejection nozzle;
a nozzle-moving unit configured to hold and move the fluid ejection nozzle;
a controller,
an imaging device configured to take images of objects existing in the machine tool, the objects including
a table before a workpiece is placed,
a head of a spindle before a tool is attached,
the tool attached to the head of the spindle, and
the workpiece placed on the table;
a processor configured to, when the tool is attached to the head of the spindle and the workpiece is placed on the table, recognize a position and a shape of each of the tool and the workpiece, based on the images of the tool and the workpiece, the image of the table before the workpiece is attached, and the image of the head of the spindle before the tool is attached, and
a further processor configured to specify, as a machining point which is variable depending upon a progress degree of machining the workpiece, a spot where the tool comes into contact with a surface of the workpiece, or a spot where the surface of the workpiece and the tool intersect with each other, based on the recognized position and shape of each of the tool and the workpiece,
wherein the controller is configured to control the nozzle-moving unit to move the fluid ejection nozzle to eject the cutting fluid to the specified machining point.

2. The cutting fluid supply system according to claim 1, wherein the nozzle-moving unit is configured to control at least one of a position and a direction of the nozzle.

3. The cutting fluid supply system according to claim 1, wherein the nozzle-moving unit is configured to control ejection of the cutting fluid.

4. The cutting fluid supply system according to claim 1, wherein the nozzle-moving unit is a robot.

5. The cutting fluid supply system according to claim 4, wherein the robot is further configured to
mount the workpiece on the table before machining the workpiece by the tool, or
take out the workpiece after machining the workpiece by the tool.

6. The cutting fluid supply system according to claim 1, wherein the imaging device is mounted on the nozzle-moving unit.

\* \* \* \* \*